No. 846,894. PATENTED MAR. 12, 1907.
J. C. BARBER.
ANTIFRICTION CENTER BEARING.
APPLICATION FILED DEC. 10, 1906.
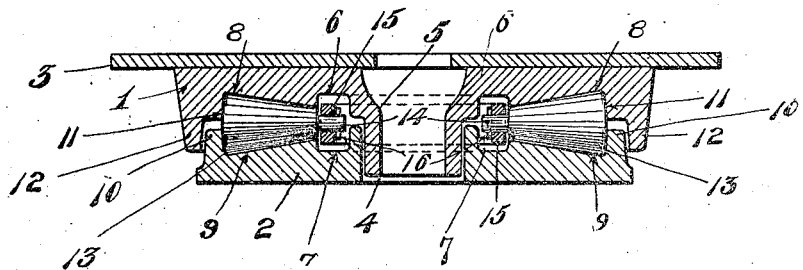
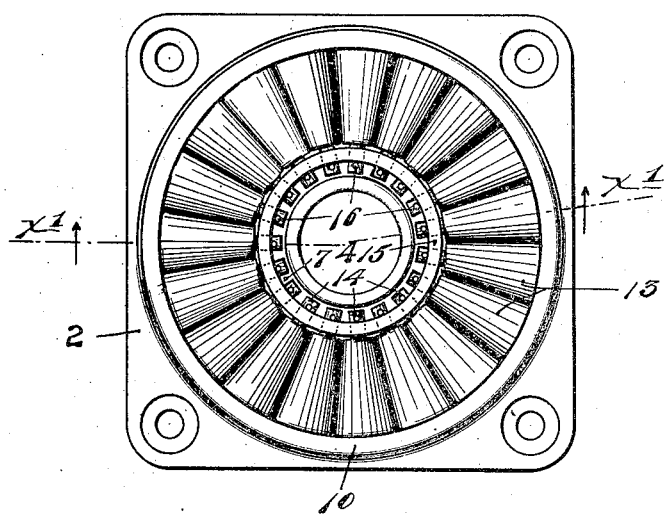
Witnesses,
H. D. Kilgore
A. H. Opsahl
Inventor,
John C. Barber,
By his Attorneys,
Williamson & Merchant

UNITED STATES PATENT OFFICE.

JOHN C. BARBER, OF CHICAGO, ILLINOIS.

ANTIFRICTION CENTER-BEARING.

No. 846,894. Specification of Letters Patent. Patented March 12, 1907.

Application filed December 10, 1906. Serial No. 347,108.

*To all whom it may concern:*

Be it known that I, JOHN C. BARBER, a citizen of the United States, residing at Chicago, in the county of Cook and State of Illinois, have invented certain new and useful Improvements in Antifriction Center-Bearings for Cars; and I do hereby declare the following to be a full, clear, and exact description of the invention, such as will enable others skilled in the art to which it appertains to make and use the same.

My present invention relates to antifriction center-bearing for cars, and has for its object to improve the same in the several particulars hereinafter noted.

The invention consists of the novel devices and combinations of devices hereinafter described, and defined in the claims.

In the accompanying drawings, which illustrate the invention, like characters indicate like parts throughout the several views.

Referring to the drawings, Figure 1 is a vertical section taken through the improved center-bearing on the line x' x' of Fig. 2, and Fig. 2 is a plan view of the center-bearing with the upper bearing member removed.

The numeral 1 indicates the upper member and the numeral 2 the lower member of the center-bearing, the former of which, as shown, has a supplemental plate-section 3 rigidly secured thereto by bolts, rivets, or other devices. (Not shown.) The said upper and lower bearing members are in practice secured in the usual or any suitable way, respectively, to the body-bolster of the car and to the truck-bolster, which bolsters are not shown in the drawings. The lower bearing member 2 is formed with a central perforation 4, and the upper bearing member 1 is formed with a depending sleeve or hub 5, that is telescoped into said perforation 4. Just outward of their hub portions said bearing members 1 and 2 are formed with annular grooves 6 and 7, respectively, that afford an annular clearance-channel for a so-called "retaining-ring," presently to be described. Outward of said grooves 6 and 7 said members 1 and 2 are formed with outwardly-diverging annular and conical roller-bearing surfaces or treads 8 and 9, respectively. At the outer extremity of the roller-bearing surface 9 said member 2 is formed with an annular thrust-flange 10. Outward of the roller-bearing surface said member 1 is formed with an annular stop-shoulder 11 and a depending annular flange 12, that is telescoped around the stop-flange 10 of said member 2.

Conical bearing-rollers 13 are interposed between the conical bearing-surfaces 8 and 9 of the bearing members 1 and 2, respectively. The outer and larger ends of said rollers 13 are rounded and engage with and thrust against the vertically-alined annular thrust-surfaces of the stop-flange 10 and stop-shoulder 12. At their inner ends the rollers 13 are formed with trunnions 14, that are journaled in a retaining-ring 15. The said retaining-ring 15 travels with the rollers 13 and works freely in the annular channel afforded by the grooves 7 and 8, respectively, of the bearing members 1 and 2. The said roller-trunnions 14, while free for rotation in the said retaining-ring 15, are interlocked therewith, so that when the bearing members 1 and 2 are separated, either by accident or design, and the rollers and rim are removed from working position the said ring will hold the rollers in their proper relative positions, so that they will not become displaced or lost. Otherwise stated, there is an interlocking pivotal connection between the roller-trunnions and the said retaining-ring. This is preferably accomplished by projecting the said trunnions 14 through said retaining-ring and passing pins or cotters 16 through said trunnions inward of said retaining-ring.

The very heavy cars which are now coming into general use require center-bearings that will withstand very great pressure, and they also require an antifriction center-bearing to relieve the center-bearing from the very great friction to which they would be subjected by a center-bearing in which the bearing members frictionally engage and slip one upon the other under pivotal movements of the trucks with respect to the car-body.

In practice I have found that in antifriction center-bearings designed to withstand great pressure conical bearing-rollers are very much better than balls, and that by placing the conical bearing-rollers in radial disposition with respect to the axis of the center-bearing, and in as close circumferential arrangement as possible an antifriction center-bearing of the greatest possible pressure-withstanding efficiency is provided. Hence in this form of my improved center-bearing I place the conical rollers in such close juxtaposition that they occupy substantially the entire annular space through which they travel under pivotal movements of the center-bearing.

In the arrangement described the outward thrust of the rollers, produced by pressure acting thereon through the outwardly-diverging conical bearing-surfaces of the upper and lower bearing members, is resisted by the annular thrust flanges or shoulders formed on the said bearing members at the outer extremities of their said conical bearing-surfaces. At the same time the said rollers are coupled together at their inner ends by the so-called "spacing-ring." Lateral shifting movements of the two center-bearing members is resisted by the telescoping hub and outer flanged portion of said members. The usual king-bolt (not shown) may be passed through the sleeve or the hub 5 of the upper bearing member 1.

A center-bearing designed as above described and as illustrated in the drawings has in practice been found highly efficient as a center-bearing for cars.

What I claim is—

1. The combination with upper and lower members of a center-bearing, formed with conical roller-bearing surfaces, and at least one of which bearing members is provided with an annular thrust flange at the outer extremity of its conical roller-bearing surface, of a plurality of conical rollers interposed between the bearing-surfaces of said upper and lower members of said center-bearing, the said rollers being closely positioned and occupying approximately the entire space in which the rollers travel, said rollers having rounded outer ends that engage and thrust against said annular thrust-shoulder, and having trunnions at their inner ends, and a retaining-ring inward of said rollers and in which the trunnions of said rollers are journaled and with which said trunnions are interlocked, substantially as described.

2. The combination with upper and lower members of a center-bearing formed with conical roller-bearing surfaces and provided at the outer extremities of their conical roller-bearing surfaces with annular thrust shoulders, of a plurality of conical rollers interposed between the bearing-surfaces of the upper and lower members of said center-bearing, the said rollers being closely positioned and occupying approximately the entire space in which the rollers travel, said rollers having their conical and outer end surfaces intact, and the outer ends of said rollers being rounded and arranged to engage and thrust against the annular thrust shoulders of said bearing members, and the said rollers also having trunnions at their inner ends, and a loose retaining-ring in which the trunnions of said rollers are journaled and with which said trunnions are interlocked with freedom for slight endwise movements, substantially as described.

In testimony whereof I affix my signature in presence of two witnesses.

JOHN C. BARBER.

Witnesses:
 MALIE HOEL,
 F. D. MERCHANT.